3,245,950
EPOXY RESIN COMPOSITIONS AND CURED
PRODUCTS OBTAINED THEREFROM
Roy T. Holm, Orinda, Calif., assignor to Shell Oil Company, New York, N.Y., a corporation of Delaware
No Drawing. Filed Aug. 15, 1962, Ser. No. 216,973
15 Claims. (Cl. 260—47)

This invention relates to new polyepoxide compositions. More particularly, the invention relates to polyepoxide compositions having improved fluidity which can be cured to form products having improved physical properties.

Specifically, the invention provides new epoxy resin compositions which have low viscosities and can be cured to form products having excellent resistance to deformation at high temperatures and good resistance to water. The new compositions comprise a mixture of (1) a polyepoxide possessing more than one vic-epoxy group, and preferably a glycidyl ether of a polyhydric phenol, and (2) a compound containing a plurality of ethylenic groups at least two of which are adjacent to hetero atoms, both the ethylenic groups and hetero atoms preferably being in a cyclic structure, such as, for example, 3,4-dihydro-1,2-pyran-2-methyl 3,4-dihydro-1,2-pyran-2-carboxylate. The invention further provides valuable cured products obtained by reacting the aforementioned compositions with epoxy curing agents, and preferably aromatic polyamines.

Polyepoxides, such as, for example, those obtained by reacting epichlorohydrin with polyhydric phenols in the presence of caustic, are promising materials for use in preparing industrial products as they may be cured to resins which are very hard and durable and have good resistance to chemicals. These resins, however, have certain undesirable properties. The resins are, for example, generally thick liquids or solids and are difficult to utilize in that form for many applications, such as in the preparation of surface compositions, castings, impregnating and sealing compositions and the like. It has been proposed to correct this defect by combining the resins with fluid inert diluents, such as dibutyl phthalate, or reactive diluents, such as butyl glycidyl ether. While this type of addition generally improves the fluidity, it has been found that the resulting cured products have lost many of the desired properties of the initial resin, such as resistance to deformation at high temperatures, good water resistance, fast rate of cure and the like.

It is, therefore, an object of the invention to provide new epoxy resin compositions. It is a further object to provide new epoxy resin compositions which have improved fluidity. It is a further object to provide new polyepoxide compositions having viscosities of say about of the order of 5 to 125 poises at 25° C. It is a further object to provide new polyepoxide compositions that can be cured to form products having good resistance to deformation at high temperatures. It is a further object to provide new compositions that can be cured to form products having good resistance to water. It is a further object to provide new epoxy resin compositions that have good flexibility. It is a further object to provide new fluid compositions which have long pot life. It is a further object to provide new fluid compositions which are suitable for preparation of multilayer laminates. It is a further object to provide new compositions suitable for preparing castings and moldings. It is a further object to provide compositions which can be cured, particularly with polyamines. It is a further object to provide cured polyepoxide compositions having improved physical properties. Other objects and advantages of the invention will be apparent from the following detailed description thereof.

It has now been discovered that these and other objects can be accomplished by the compositions of the invention comprising a mixture of (1) a polyepoxide possessing more than one vic-epoxy group, and preferably a glycidyl ether of a polyhydric phenol, and (2) a compound containing a plurality of ethylenic groups at least two of which are adjacent to hetero atoms, the ethylenic groups and hetero atoms preferably being in a cyclic structure, such as, for example, 3,4-dihydro-1,2-pyran-2-methyl 3,4-dihydro-1,2-pyran-2-carboxylate. It has been found that these new compositions have surprisingly low viscosities, and can be poured and otherwise handled as liquid. In addition, the new compositions have a surprisingly good pot life and storage stability. Furthermore, the cured products obtained by reacting the compositions with epoxy curing agents, and preferably the aromatic polyamines, have excellent physical properties, such as high heat distortion points, good flexibility and good resistance to water.

It was quite surprising to find that the above-described ethylenically unsaturated compounds could be used as superior diluents for the polyepoxide compositions, particularly because it was not known heretofore that the groupings, such as the vinylic ether groups, could enter the curing reaction and be bound in the molecule so as to enhance the physical properties, and there was no reason to expect that their presence would enhance the properties of the cured products. The most effective diluents heretofore have been epoxy-containing materials which can enter the cure through opening up of the epoxy group. Evidence of the superior properties of the new compositions maybe found in the working examples at the end of the specification.

The material to be combined with the polyepoxides comprise those compounds containing a plurality of ethylenic groups at least two of which are adjacent to hetero atoms, both of the ethylenic groups and hetero atoms preferably being in a cyclic structure. By hetero atom is meant a polyvalent atom other than carbon, such as, for example, oxygen, nitrogen, sulfur, phosphorous, arsenic, antimony, tin, lead, silicon, and the like. Cyclic groups which contain both the hetero atom and the ethylenic group include, among others, the tetrahydropyridine, dihydropyran, thiophene, pyrrole, furan, and the like rings and their substituted derivatives, such as, for example, their alkylated and alkoxy-substituted derivatives.

A preferred group of the above-described compounds may be exemplified by the following structural formula

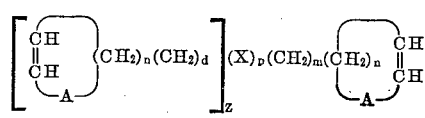

wherein A is oxygen, sulfur, nitrogen, phosphorous, arsenic, antimony, tin, lead, silicon, or germanium, X is a member of the group consisting of hydrocarbon radical, ether oxygen atom, ester linkage, nitrogen atom or amide linkage

or polyurethane linkage

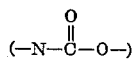

$n$ is an integer of at least 1, $d$ and $m$ are integers of 0 to 10, $p$ is 0 or 1 and $z$ is integer of at least 1, preferably 1 to 6.

Especially preferred compounds of the above-described group includes those of the formula

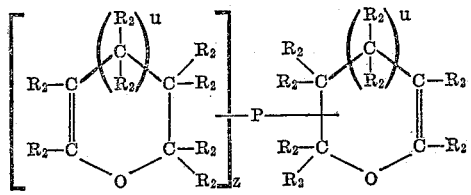

wherein $R_2$ is hydrogen, alkyl, alkoxy or halogen, $u$ is 0 or 1, P is a hydrocarbon radical or substituted hydrocarbon radical, such as one containing an ether oxygen, —S—, —SS—, ester, amide, imide, methane, epoxide or the like grouping, and z is an integer of at least 1 and preferably 1 to 6.

Examples of the above-described compounds include, among others, 3,4-dihydro-1,2-pyran-2-methyl 3,4-dihydro-1,2-pyran-2-carboxylate

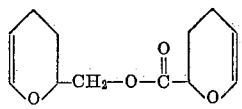

3,4-dihydro-1,2-pyran-2-methyl 2,3-dihydrothiophene-2-carboxylate

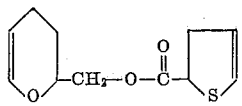

3,4-dihydro-1,2-pyran-2-methyl N-methyl-1,2,3,4-tetrahydropyridine-2-carboxylate

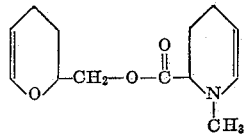

3,4-dihydro-1,2-pyran-2-methyl N-methyl-2,3-dihydropyrrole-2-carboxylate

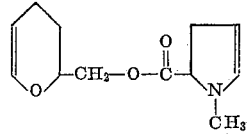

3,4-dihydro-1,2-pyran-2-methyl 2,3-dihydrofuran-2-carboxylate

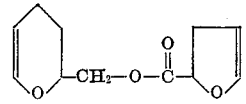

1,5-bis(3,4-dihydro-1,2-pyran-2-methoxy)pentane

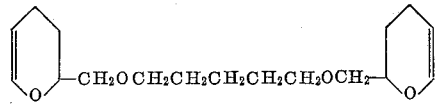

1,2,6-tris(3,4-dihydro-1,2-pyran-2-methoxy)hexane

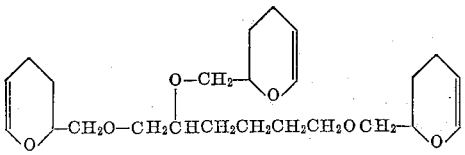

1,5-bis(3,4-dihydro-1,2-pyran-2-methylmercapto)pentane

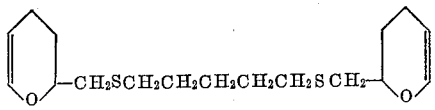

N-methyl-2,3-dihydropyrrole-2-methyl N-methyl-1,2,3,4-tetrahydropyridine-2-carboxylate

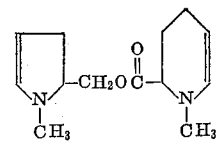

3,4-dihydro-2,5-dioctyl-1,1-pyran-2-butyl 3,4-dihydro-1,2-pyran-2-carboxylate

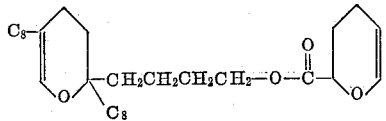

2,3-dihydrofuran-2-butyl-2-furoate

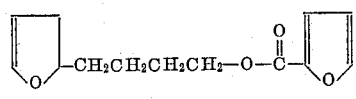

2,3-dihydrofuran-2-hexylpyrrole-2-carboxylate

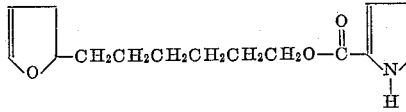

2,3-dihydrofuran-2-octyl 2,3-dihydrofuran-2-carboxylate

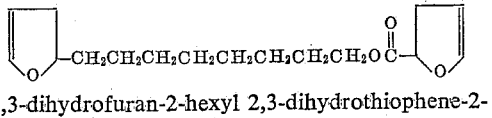

2,3-dihydrofuran-2-hexyl 2,3-dihydrothiophene-2-carboxylate

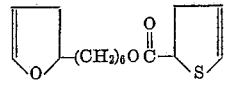

Other examples include compounds of the formulae:

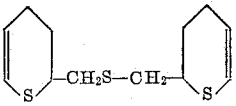

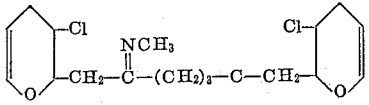

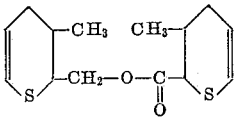

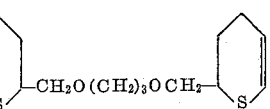

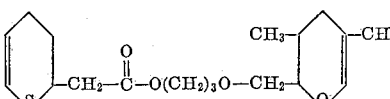

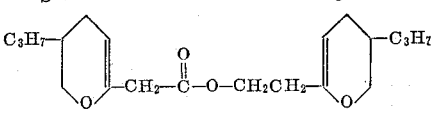

Other examples include compounds having more than 2 heterocyclic rings, such as

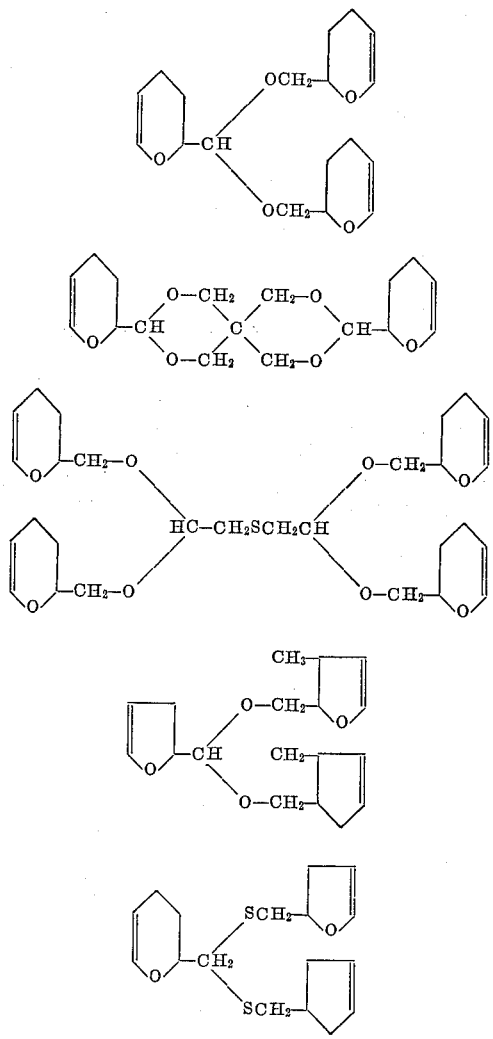

A valuable group of the diluents include those of the formula

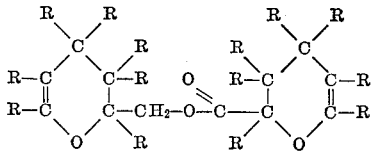

in which each R represents hydrogen or a hydrocarbon radical (and preferably an alkyl group). Examples of these compounds include, among others, 3,4-dihydro-1,2-pyran-2-methyl 3,4-dihydropyran-2-carboxylate 4-butyl-3,4-dihydro-1,2-pyran-2-methyl 3,4-dihydropyran-2-carboxylate;
3,4-diethyl-3,4-dihydro-1,2-pyran-2-methyl 3,4-dihydropyran-2-carboxylate;
3,4-diisopropyl-3,4-dihydro-1,2-pyran-2-methyl 3,4-diisopropyl-3,4-dihydropyran-2-carboxylate;
4-hexyl-3,4-dihydro-1,2-pyran-2-methyl 3,4-diisopropyl-3,4-dihydropyran-2-carboxylate;
4,5-di-tert-butyl-3,4-dihydropyran-2-methyl 4-hexyl-3,4-dihydropyran-2-carboxylate;
4,6-dioctyl-3,4-dihydropyran-2-methyl 4-octyl-3,4-dihydropyran-2-carboxylate;
2,5-didodecyl-3,4-dihydropyran-2-methyl 4-octyl-3,4-dihydropyran-2-carboxylate.

The above-described compounds can be prepared by a variety of different methods. The esters of the heterocyclic acids and heterocyclic alcohols can, for example, be prepared by reacting a salt of the acid with a halide corresponding to the heterocyclic alcohol. The ethers can be obtained by reacting the alcohol with a halide corresponding to the heterocyclic acid in the presence of a suitable catalyst. The amides may be prepared by reacting the heterocyclic amine with the desired heterocyclic acid in the presence of conventional catalysts. Alternatively the esters may be prepared by reacting aldehyde, such as the 3,4-dihydro-1,2-pyran 2-carboxaldehyde with the catalyst, such as aluminum isopropoxide, so as to effect a Tischenko reaction and formation of an ester group between two molecules of the aldehyde. This latter method is descibed in U.S. 2,537,921.

The polyepoxides to be used in preparing the compositions of the present invention include those compounds possessing more than 1 vic-epoxy group, i.e., a

group. These polyepoxides may be saturated or unsaturated, aliphatic, cycloaliphatic, aromatic or heterocyclic and may be substituted if desired with non-interfering substituents, such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticica tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl)adepate, di(2,3-epoxybutyl)oxalate, di(2,3-epoxyhexyl)succinate, di(3,4-epoxybutyl)maleate, di(2,3-epoxyoctyl)pimelate, di(2,3-epoxybutyl)phthalate, di(2,3 - epoxyoctyl)-tetrahydrophthalate, di(4,5-epoxydodecyl)maleate, di-(2,3-epoxybutyl)terephthalate, di(2,3-epoxypentyl)thiodipropionate, di(5,6-epoxytetradecyl)diphenyldicarboxylate, di(3,4-epoxyheptyl)sulfonyldibutyrate, tri(2,3 - epoxybutyl) 1,2,4-butanetricarboxylate, di(5,6-epoxypentadecyl)-tartarate, di(4,5-epoxytetradecyl)maleate, di(2,3 - epoxybutyl)azelate, di(3,4-epoxybutyl)citrate, di(5,6-epoxyoctyl)cyclohexane-1,3-dicarboxylate, di(4,5 - epoxyoctadecyl)malonate.

Another group of the epoxy-containing materials include those epoxidized esters of unsaturated alcohols and unsaturated carboxylic acids, such as 2,3-epoxybutyl 3,4-epoxypentanoate; 3,4-epoxyhexyl, 3,4-epoxypentanoate; 3,4-epoxycyclohexyl 3,4-epoxycyclohexanoate; 3,4-epoxycyclohexyl 4,5-epoxyoctanoate; 2,3-epoxycyclohexylmethyl epoxycyclohexane carboxylate.

Still another group of the epoxy-containing materials include epoxidized derivatives of polyethylenically unsaturated polycarboxylic acid such as, for example, dimethyl 8,9,12,13 - diepoxyeicosanedioate; dibutyl 7,8,11,12 - diepoxyoctadecanedioate; dioctyl 10,11-diethyl-8,9,12,13-diepoxy-eicosanedioate; dihexyl 6,7,10,11-diepoxyhexadecanedioate, didecyl 9-epoxy-ethyl-10,11-epoxyoctadecenedioate; dibutyl 3-butyl-3,4,5,6-diepoxycyclohexane-1,2-dicarboxylate; dicyclohexyl 3,4,5,6-diepoxycyclohexane-1,2-dicarboxylate; dibenzyl 1,2,4,5-diepoxycyclohexane-1,2-dicarboxylate and diethyl 5,6,10,11-diepoxyoctadecyl succinate.

Still another group comprise the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexyl)propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in above noted U.S. 2,633,458 are good examples of polyepoxides of this type. Other examples includes the polyglycidyl ether of 1,1,2,2-tetrakis(4-hydroxyphenyl)ethane (epoxy value of 0.45 eq./100 g. and melting point 85° C.), polyglycidyl ether of 1,1,5,5-tetrakis(hydroxyphenyl)pentane (epoxy value 0.514 eq./100 g.) and the like and mixtures thereof.

Other examples of the glycidyl ethers include the glycidyl ethers of novolac resins which resins are obtained by condensing an aldehyde with phenol. A typical member of this class is the epoxy resin from a condensate of formaldehyde and 2,2 - bis(4 - hydroxyphenyl)propane novolac resin.

The glycidyl polyethers of polyhydric phenols obtained by condensing the polyhydric phenols with epichlorohydrin are also referred to as "ethoxylene" resins. See Chemical Week, vol. 69, page 27, for September 8, 1951.

Of particular value in the process of the invention are the polyepoxides containing only carbon, hydrogen, oxygen and halogen atoms.

The compositions of the invention may be prepared by any suitable method. If both of the two components are liquids, the compositions may be simply prepared by mixing the two together. If the polyepoxide is a thick liquid or solid, it is generally preferred to heat the hard material before or during the mixing. Various solvents or diluents which will evaporate before or during cure may be added to assist in the preparation, but the addition of these materials is not generally desirable as it usually lengthens the time of cure of the finished product.

The ratio of the polyepoxide and the special diluent noted above will vary within certain limits depending upon the properties desired in the resulting products. Compositions having desired properties are obtained when the special diluent makes up at least 1% by weight of the mixture, and preferably 5% to 8% by weight of the mixture. Particularly good results are obtained when the special diluent makes up from 10% to 50% and the polyepoxide makes up from 90% to 50% by weight of the combined mixture.

Other materials, such as fillers, dyes, plasticizers, stabilizers and the like may be added as desired along with suitable other resinous materials, such as vinyl resins, tars, pitches, distillate oils, alkyd resins and the like.

The compositions of the invention may be cured by the action of a curing or hardening agent. For this purpose, epoxy curing agents, which may be acidic, neutral or alkaline, are added. Examples of the curing agents include, among others, alkalies like sodium or potassium hydroxide; alkali phenoxides like sodium phenoxide; carboxylic acids or anhydrides, such as phthalic anhydride, tetrahydrophthalic anhydride; dimer or trimer acids derived from unsaturated fatty acids, 1,20-eicosanedioic acid, and the like, Friedel-Crafts metal halides, such as aluminum chloride, zinc chloride, ferric chloride; salts such as zinc fluoborate, magnesium perchlorate, zinc fluosilicate; phosphoric acid and partial esters thereof including N-butyl ortho-phosphate, diethyl ortho-phosphate and hexaethyltetraphosphate; amino compounds, such as, for example, diethylene triamine, triethylene tetramine, dicyandiamide, melamine, pyridine, cyclohexylamine, benzyldimethylamine, benzylamine, diethylaniline, triethanolamine, piperidine, tetramethylpiperizine, N,N-dibutyl-1,3-propane diamine, N,N-diethyl-1,3-propane diamine, 1,2-diamino-2-methylpropane, 2,3-diamino-2-methylbutane, 2,4-diamino-2-methylpentane, 2,4-diamino-2,6-diethyloctane, dibutylamine, dioctylamine, dinonylamine, distearylamine, diallylamine, dicyclohexylamine, methylethylamine, ethylcyclohexylamine, pyrrolidine, 2-methylpyrrolidine, tetrahydropyridine, 2,6-diaminopyridine, meta-phenylene diamine, and the like, and soluble adducts of amines and polyepoxides and their salts, such as described in U.S. 2,651,589 and in U.S. 2,640,037. Also included are the polyamides as isophthalamide, and amino-amides obtained by reacting polybasic acids with polyamines such as diethylene triamine or p-aminobenzamide.

Preferred curing agents are the polycarboxylic acids and their anhydrides, the primary and secondary aliphatic, cycloaliphatic, aromatic and heterocyclic amines, and preferably the polyamines and adducts of amines and epoxides.

Coming under special consideration are the amine curing agents as they are particularly effective at reacting with the ethylenic group of the above-noted special components combined with the epoxy resins. These include, among others, the aliphatic, cycloaliphatic, aromatic and heterocyclic mono- and polyamines, as well as aminocontaining materials such as may be obtained by reacting polyamines with alkylene oxides, acrylonitrile, or by reacting polyepoxides with amines and the like, and the amino-containing polyamides obtained by reacting polycarboxylic acids with an amine as described in U.S. 2,450,940 and 2,695,908. Particularly preferred are the aromatic amines.

The amount of the curing agent employed will vary depending upon the type of agent selected. In general, the amount of the curing agent will vary from about 0.5% to 200% by weight of the combined mixture of epoxy ether and epoxy ester. The tertiary amines and $BF_3$ complexes are preferably employed in amounts varying from about 0.5% to 20% and the metal salts are preferably employed in amounts varying from about 1% to 15%. The secondary and primary amines, acids and anhydrides are preferably employed in at least .8 equivalent, an equivalent amount being that sufficient to furnish one active hydrogen atom or carboxyl group or anhydride group for every epoxy group to be reacted. Such combinations are preferably combined in equivalent ratios which vary from about .6:1 to 1.5:1. To obtain superior results, it is also possible to consider the ethylenic group in the new reactive diluent as a center for cure with agents such as the amines, and when considering an equivalent amount of curing agent, additional amounts may be added for reaction at this point. As both equivalent amounts (i.e., one counting only epoxies and the other counting epoxy + 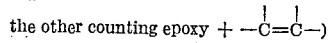—) are effective, this gives the formulator more leeway for addition of curing agent and a way to increase speed by increasing the amount of curing agent.

Accelerators or catalysts may be used with any of the above-described curing agents. When one utilizes amine curing agents, it is sometimes desirable to utilize acidic-type accelerators, such as amine hydrochlorides, stannous chloride, ferrous chloride and the like, as well as peroxides as benzoyl peroxide and the like. Such materials are employed in minor amounts, such as, for example, 0.01% to 5% by weight of the curing agent.

The curing of the above-described compositions to form the desired insoluble infusible products may be accomplished by merely mixing the above-noted curing agents in the desired amounts with the compositions of the present invention. The most active curing agents, such as the polyamines as diethylene triamine, are reactive at room temperature and application of heat is not necessary to effect the cure. Other agents, such as the aromatic polyamines are not quite at active at the lower temperatures and it is desirable to apply heat to speed cure. Temperatures employed will vary from about 30° C. to as high as or higher than 250° C.

The compositions of the invention may be utilized for a variety of applications because of their excellent fluidity and improved properties. The compositions are ideally suited for use in preparing coating compositions, impregnating and sealing compositions, foams, pottings, castings, adhesives and the like.

When used for coating compositions, the new compositions of the invention may be used as such or mixed with various additives, such as plasticizers, stabilizers and extenders such as oils, resins, tars, pitches, distillates and the like, and then combined with the desired curing agent. The coatings prepared in this manner may be allowed to set hard at room temperature or heat may be applied to hasten the cure.

The products of the invention may also be used in preparing pottings and castings for electrical apparatus. In actual practice, the compositions are generally combined with the desired curing agent and the mixture poured into the mold or casting containing the electrical apparatus, such as electrical motors and the like, and the mixture allowed to set. Heat may also be applied to hasten cure.

The resinous products may also be employed to prepare valuable foamed products. In this application resinous products of the invention are preferably combined with the desired curing agents and foaming agents and others, such as thixotropic agents, pigments, stabilizing agents and the like that may be desired. This mixture may be foamed and cured by allowing to stand or by applying heat.

The products of the invention may also be employed to prepare valuable adhesives and impregnating compositions. In utilizing the products for these applications it is generally desirable to combine them with the desired curing agent and any suitable diluent such as acrylonitrile, acetonitrile, crotonitrile, and desired fillers and stabilizers and then apply this mixture to the desired surface. Adhesive compositions prepared in this manner may be used to unite various surfaces such as wood-to-wood, metal-to-metal, resin-to-resin, and the like. The adhesives may be allowed to set at room temperature or heat may be applied to hasten the cure.

To illustrate the manner in which the invention may be carried out, the following examples are given. It is understood, however, that the examples are for the purpose of illustration and the invention is not to be regarded as limited to any of the specific conditions cited therein.

*Example I*

This example illustrates the preparation and use of a composition containing a glycidyl polyether of 2,2-bis(4-hydroxyphenyl)propane and 3,4 - dihydro - 1,2-pyran-2-methyl 3,4-dihydro-1,2-pyran-2-carboxylate.

35 parts of 3,4-dihydro-1,2-pyran-2-methyl 3,4-dihydro-1,2-pyran-2-carboxylate was mixed with 65 parts by weight of a glycidyl polyether of 2,2-bis(4-hydroxyphenyl)propane (Polyether A noted in U.S. 2,633,458). The resulting mixture was quite fluid and had a viscosity of 8.4 poises at 25° C. The glycidyl polyether of 2,2-bis(4-hydroxyphenyl)propane had a viscosity of 180 at 25° C.

The above mixture was combined with 17.7 parts of metaphenylene diamine (chemical equivalent amount based on equivalency as to double bonds and epoxy groups). The viscosity is about 8 poises after 8 hours. In a related experiment with a sample containing only the glycidyl polyether and the meta-phenylene diamine, the viscosity had changed from 180 poises to 1700 poises at 25° C. after 8 hours. This clearly demonstrates the good room temperature stability of the above-noted mixture in combination with aromatic amine curing agents.

The above-noted composition was heated at 100° C. for 2 hours and then 150° C. for 24 hours. The resulting product was a hard insoluble infusible product having high heat distortion temperature 163° C. and good flexibility. The cured product had the following properties: tensile strength 10,280 p.s.i.; elongation 2.56%; modulus $5.76 \times 10^5$ p.s.i.

*Example II*

This example illustrates the use of the composition shown in Example I for the preparation of a multi-layer laminate.

Sheets of 181 type weave glass cloth (Volan A finish) were stacked together with warp to fill thread nested together so as to form a 14 ply laminated structure. The composition was then dried at 90° C. for .5 hour.

The composition shown in Example I made up of 30 parts of 3,4-dihydro-1,2-pyran-2-methyl 3,4-dihydro-1,2-pyran-2-carboxylate and 70 parts of glycidyl polyether of 2,2-bis(4-hydroxyphenyl)propane was combined with 14.15 parts of meta-phenylene diamine and the mixture poured on the top of the above-noted laminated structure, a layer of cellophane placed on top and the cellophane pressed down so as to force the mixture into the laminated structure. The mixture of resin gradually spread throughout the structure. The laminate was then cured for 12 minutes at contact pressure and 100° C. followed by 48 minutes at 110° C. and 25 p.s.i. Strips of the laminate were then post cured for 40 hours at 350° F. The resulting product was tested for strength and resistance to water. Results showed the product had excellent flexural strength and good water resistance.

*Example III*

This example illustrates the preparation and use of a composition containing a glycidyl polyether and di(3,4-dihydro-1,2,-pyran-2-methyl)ether.

30 parts of di(3,4-dihydro-1,2-pyran-2-methyl) ether is mixed with 70 parts of a glycidyl polyether of 2,2-bis(4-hydroxyphenyl)propane having an epoxy value of 0.52 and molecular weight of 355. The resulting mixture is quite fluid and has a low viscosity. The mixture is then combined with an equivalent amount of meta-phenylene diamine (based on epoxy equivalency) and the mixture cured for 24 hours at 150° C. The resulting product had a high heat distortion point and good water resistance.

Example IV

This example illustrates the preparation and use of a composition containing a glycidyl polyether and 2,3-dihydrofuran-2-methyl-2-furoate.

20 parts of 2,3-dihydrofuran-2-methyl 2-furoate is mixed with 80 parts of the glycidyl polyether defined in the preceding example. The resulting mixture is quite fluid and has a low viscosity. The mixture is then combined with an equivalent amount of meta-phenylene diamine (based on epoxy equivalency) and the mixture cured for 24 hours at 150° C. The resulting product has a high heat distortion point and good water resistance.

Example V

Examples I to IV are repeated with the exception that the epoxy resin employed is an epoxidized cyclohexenyl cyclohexene carboxylate. Related results are obtained.

Example VI

Examples I to V are repeated with the exception that the curing agent employed is methylene dianiline. Related results are obtained.

Example VII

Examples I, III and IV are repeated with the exception that the epoxy resin employed is Polyether B described in U.S. 2,633,458, the glycidyl ether of 1,1,2,2-tetrakis(4-hydroxyphenyl)ethane having an epoxy value of 0.45 eq./100 g. and melting point of 85° C. and a glycidyl ether of a formaldehyde-phenol resin (novolac resin). Related results are obtained.

Example VIII

Example I is repeated with the exception that the 3,4-dihydroxy-1,2-pyran-2-methyl 3,4-dihydro-1,2-pyran-2-carboxylate is replaced by equal amounts by weight of the following:

4-butyl-3,4-dihydro-1,2-pyran-2-methyl 4-butyl-3,4-dihydro-1,2-pyran-2-carboxylate;
3,4-dihydro-1,2-pyran-2-methyl 2,3-dihydrothiophene-2-carboxylate;
2,3-dihydrothiophene-2-methyl 2,3-dihydrothiophene-2-carboxylate;
3,4-dihydro-1,2-pyran-2-methyl 2,3-dihydropyran-2-carboxylate;
N-methyl-2,3-dihydropyrrole-2-methyl N-methyl 1,2,3,4-tetrahydropyridine-2-carboxylate; and
2,3-dihydropyran-2-hexyl pyrrole-2-carboxylate.

Related results are obtained.

Example IX

This example illustrates the preparation and use of a composition containing a glycidyl polyether and a polydihydropyran compound.

30 parts of bis(3,4-dihydro-1,2-pyran-2-methoxy) 3,4-dihydro-1,2-pyranyl methane is mixed with 70 parts of glycidyl polyether of resorcinol. The resulting mixture is then combined with an equivalent amount of meta-phenylene diamine (based on epoxy equivalency) and the mixture cured for 24 hours at 150° C. The resulting product has a high heat distortion point and good water resistance.

Related results are obtained by replacing the polydihydropyran with equal amounts of each of the following: bis(3,4-dihydrofuran-2-methoxy) 2,3-dihydrofuranyl methane; 1,2,6-tris(3,4-dihydro-1,2-pyran-2-methoxy)-hexane; and 1,2,3-tris(2,3-dihydrofuran-2-methoxy)propane.

Example X

Example I is repeated with the exception that the diluent employed is bis(3,4-dihydro-1,2-(2)pyronyl)ether and its corresponding thioether. Related results are obtained in each case.

I claim as my invention:

1. A composition comprising (1) a polyepoxide possessing more than one vic-epoxy group, and (2) from 1% to 50% by weight of a compound containing a plurality of ethylenic groups which are adjacent to separate hetero atoms.

2. A composition comprising (1) a polyepoxide possessing more than one vic-epoxy group, and (2) from 1% to 50% by weight of a compound containing a plurality of ethylenic groups which are adjacent to separate hetero atoms of the group consisting of oxygen, sulfur, nitrogen, phosphorous, arsenic, antimony, tin, lead, silicon and germanium, said ethylenic groups being contained in a cyclic structure.

3. A composition comprising (1) a polyepoxide possessing more than one vic-epoxy group, and (2) from 1% to 50% by weight of a compound of the formula

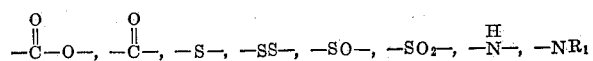

wherein A is a member of the group consisting of oxygen, sulfur, nitrogen, phosphorus, arsenic, antimony, tin, lead, silicon and germanium, X is a member of the group consisting of hydrocarbon radicals, ether oxygen atom,

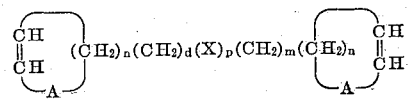

wherein $R_1$ is a hydrocarbon radical, $n$ is an integer of at least 1, $d$ and $m$ are integers of 0 to 10, $p$ is 0 or 1.

4. A composition comprising (1) a polyepoxide possessing more than one vic-epoxy group and (2) from 1% to 50% by weight of a compound containing a plurality of ethylenic groups adjacent to an ether oxygen atom, said ethylenic group being contained in a cyclic structure.

5. A composition as in claim 4 wherein the compound in (2) is a 2,3-dihydrofuran-2-alkyl 2,3-dihydrofuran carboxylate.

6. A composition as in claim 4 wherein the compound is a bis(3,4-dihydro-1,2-pyran-2-alkyl)ether.

7. A composition comprising (1) a polyepoxide possessing more than one vic-epoxy group and (2) from 1% to 50% by weight of a compound of the structure

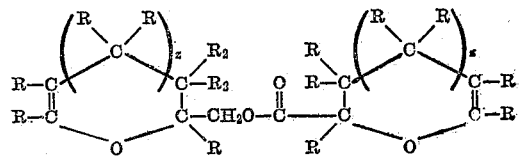

wherein R is a member of the group consisting of hydrogen and alkyl radicals, and $z$ is an integer of 0 to 1.

8. A composition as in claim 7 wherein the compound of the structure shown in (2) is a 3,4-dihydro-1,2-pyran-2-methyl 3,4-dihydro-1,2-pyran-2-carboxylate.

9. A composition comprising (1) a glycidyl polyether of a polyhydric phenol and from 1% to 50% by weight of 3,4-dihydro-1,2-pyran-2-methyl 3,4-dihydro-1,2-pyran-2-carboxylate.

10. A composition comprising (1) 99 parts to 50 parts by weight of a glycidyl polyether of 2,2-bis(4-hydroxyphenyl)propane having a molecular weight up to 4000, and (2) 1 to 50 parts by weight 3,4-dihydro-1,2-pyran-2-methyl 3,4-dihydro-1,2-pyran-2-carboxylate.

11. A composition as in claim 7 wherein the liquid compound containing the ethylenic group is an alkyl-substituted 3,4-dihydro-1,2-pyran-2-methyl 3,4-dihydro-1,2-pyran-2-carboxylate.

12. An insoluble infusible product obtained by heating the composition defined in claim 3 with an amine curing agent.

13. An insoluble infusible product obtained by heating the composition defined in claim 1 with an amine curing agent.

14. An insoluble infusible product obtained by heating the composition defined in claim 7 with an aromatic polyamine.

15. An insoluble infusible product obtained by heating the composition defined in claim 7 with meta-phenylene diamine.

References Cited by the Examiner

UNITED STATES PATENTS

| 2,562,848 | 7/1951 | Whetstone | 260—345.8 |
| 3,078,271 | 2/1963 | De Groote et al. | 260—347.7 |
| 3,116,301 | 12/1963 | Williams et al. | 260—345.8 |

FOREIGN PATENTS 598,644   5/1960   Canada.

LEON J. BERCOVITZ, *Primary Examiner.*

JOSEPH L. SCHOFER, DONALD E. CZAJA,
*Examiners.*

F. McKELVEY, *Assistant Examiner.*